J. CLOSE.
FENDER FOR MOTOR CARS AND THE LIKE.
APPLICATION FILED SEPT. 5, 1913.
1,200,169.  Patented Oct. 3, 1916.
FIG.1.
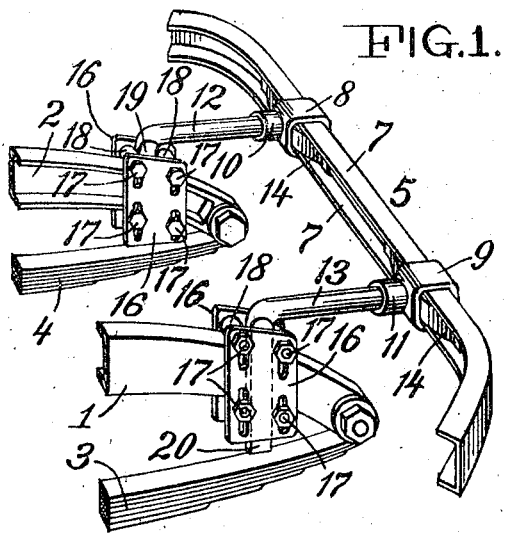
FIG.2.
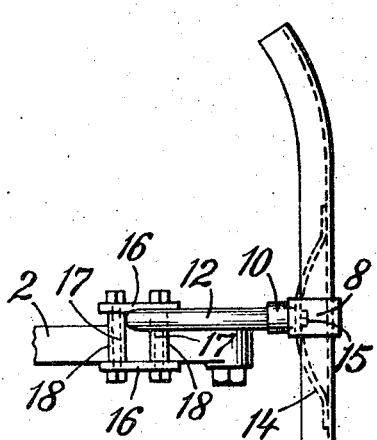
FIG.4.
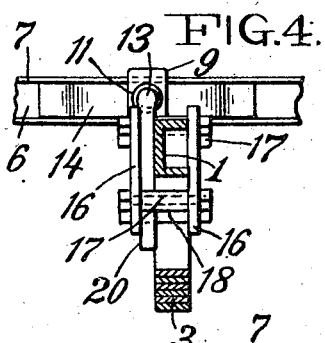
FIG.3.
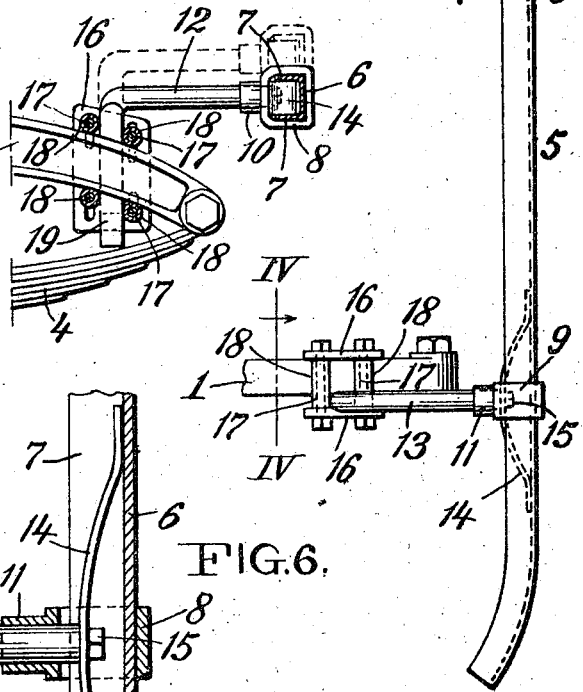
FIG.5.
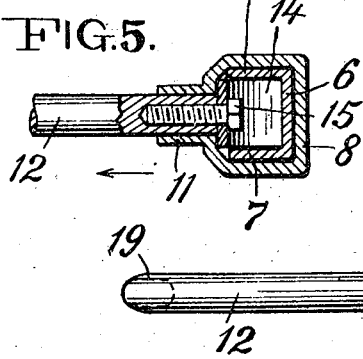
FIG.6.
WITNESSES:
Karl S. Weitz
Oliver Williams
INVENTOR
James Close
BY
Gerald E. Terwilliger ATTORNEY

UNITED STATES PATENT OFFICE.

JAMES CLOSE, OF NEWARK, NEW JERSEY.

FENDER FOR MOTOR-CARS AND THE LIKE.

1,200,169.   Specification of Letters Patent.   Patented Oct. 3, 1916.

Application filed September 5, 1913. Serial No. 788,206.

*To all whom it may concern:*

Be it known that I, JAMES CLOSE, a citizen of the United States, residing in the city of Newark, county of Essex, and State of New Jersey, have invented certain new and useful Improvements in Fenders for Motor-Cars and the like, of which the following is a specification.

My invention relates to fenders or bumpers particularly adapted to be applied to motor cars to protect the front or rear of the car from damage by collision. These bumpers are commonly attached to the spring-hangers of the semi-elliptic springs upon which the car body is hung. Hitherto it has been customary to attach many forms of bumpers or fenders to the spring-hangers by drilling holes in the hangers or other portions of the frame or chassis, a proceeding which is objectionable since it tends to weaken the part thus perforated, and also requires the use of special tools. It has also been customary to attach certain forms of bumpers to the bolt securing the spring to the projecting end of the spring-hanger. This is further objectionable, for the reason that a sharp shock transmitted to this bolt through the bumper is likely to shear off the bolt and release the spring from the hanger, thus dropping the chassis of the car with a violent shock upon the front or rear axle as the case may be, and causing a serious derangement of the entire mechanism of the machine.

My invention is directed to certain improvements in the construction of the bumper itself and also in the means for attaching the same to the spring-hanger in such a manner that the maximum of adjustability is afforded without in any way weakening the member to which the bracket-carrying bumper bar is secured. As no holes need be drilled in the frame of the car, the only tool required in applying the bumper to a car is a wrench.

In the accompanying drawings which form a part of this specification, Figure 1 is a perspective view showing my improved bumper attached to the spring-hanger of a motor car; Fig. 2 is a plan view; Fig. 3 is a side elevation, partly in section, showing the method of attaching the bracket to the frame of the car or spring-hanger, and also illustrating the adjustable feature of my device; Fig. 4 is a fragmentary transverse sectional view on line IV—IV of Fig. 2; Fig. 5 is an enlarged sectional view, illustrating the method of attaching the bumper-bar to its bracket, and Fig. 6 is a longitudinal sectional view of one of the brackets and a portion of the bumper bar.

Referring to the drawings in detail, the numerals 1 and 2 indicate the spring-hangers of a motor car or the like, to which are respectively secured the semi-elliptic springs 3 and 4. The numeral 5 designates a fender or bumper-bar, preferably having a channel section, comprising the web or base 6 and the flanges 7, the ends of the bumper preferably being curved inwardly toward the machine as shown. Surrounding the bar are two straps 8 and 9, which prevent vertical movement of the bar but which are longer in horizontal dimension than the width of the flanges of the channel. These straps terminate in hollow barrels 10 and 11, which are slidably mounted upon two angular bracket members, 12 and 13, respectively. To the end of each bracket which is received within the barrel members is attached a leaf-spring 14 by means of a stud-bolt 15. The ends of these springs are received between the flanges of the channel and normally press the fender or bumper-bar away from the bracket so that the bar seats firmly against the outer portions of the straps, that is, the portions remote from the barrel members. It will be observed, however, that there is nothing except the resiliency of the springs to prevent the movement of the fender or bumper-bar in the direction of the arrow in Fig. 5, to such an extent that the web of the channel meets the head of the bolt 15.

The down-turned portions of the brackets 12 and 13 are clamped to the spring-hangers by means of pairs of similar plates 16, which are slotted to receive the bolts 17, which may be surrounded by barrel members 18. The down-turned portions of the brackets 12 and 13 are flattened at 19 and 20, respectively, so that they may be firmly clamped against the flat sides of the spring-hangers 1 and 2, when the nuts on the bolts 17 are tightened. The slots which receive the bolts are parallel and substantially vertical, to provide for the application of the device to spring-hangers of varying widths in a vertical direction.

Fig. 3 indicates the manner in which the device is adjustable in order to alter the height at which the fender bar may be placed on cars of varying design, to afford the maximum protection to the lamps, radiator, and other vulnerable parts found at the front or rear of the machine. Owing to the provision of the long slots in the plates 16, the position of plates, brackets and bumper-bar may be readily adjusted so as to be nearer to or farther from the car body in a horizontal direction, as circumstances may require.

When the bumper-bar collides with another body, the springs 14 will yield, permitting the bar to travel toward the car for a short distance, as the barrels 10 and 11 slide longitudinally along the bracket members 12 and 13. This condition is illustrated in Fig. 6. This travel is frequently sufficient to take up the shock of a slight collision, but in case it is not, the web of the channel will finally come to rest, abutting firmly against the heads of the bolts 15 and thus transmitting the shock direct to the chassis through the spring-hangers, without affecting the means which secure the springs to the hangers. The strain incident upon a severe collision is therefore transmitted direct to the frame-work of the car, which is best able to stand the shock. In the case of a glancing blow upon either end of the bar, the spring nearest to that end will yield in a manner similar to that already described, and the added angularity given to the end of the bar by virtue of this yielding action, is of aid in causing the object encountered to be forced sidewise past the car, instead of coming to rest solidly against the fender.

While I have illustrated and described only one specific embodiment of my device, I realize that it is susceptible of wide modification, and I do not desire to be limited to the precise structure shown and described.

Having thus described my invention, I claim:

1. In a fender, a buffer-bar, a support relatively fixed with respect thereto, means for movably mounting said bar upon said support and a leaf-spring centrally mounted upon said support and having a sliding engagement at each end with said bar to force the same away from the support.

2. In a fender, a buffer-bar, a support relatively fixed with respect thereto, means for movably mounting said bar upon said support and a leaf-spring centrally mounted upon said support and having a sliding engagement at each end with said bar to force the same away from the support, the ends of said spring being otherwise disconnected from said bar.

3. In a fender a channel buffer-bar, a support relatively fixed with respect thereto, means for mounting said bar upon said support, including a member slidably mounted upon said support, and a member for retaining said bar, and a spring affixed to the end of said support and engaging the web of said bar.

4. In a fender a buffer-bar, a support relatively fixed with respect thereto, means for mounting said bar upon said support, including a member slidably mounted upon said support, and a strap encircling said bar, and a spring for pressing said bar against said strap.

5. In a fender a buffer-bar, a support relatively fixed with respect thereto, means for mounting said bar upon said support, including a member slidably mounted upon said support, and a strap encircling said bar, and a spring mounted within said strap, engaging said support and said bar.

6. In a fender a buffer-bar, a support relatively fixed with respect thereto, means for mounting said bar upon said support, including a member slidably mounted upon said support, and a strap encircling said bar, and a leaf-spring mounted within said strap and having its ends engaging said bar and forcing the same against said strap, the fixed portion of the spring engaging said sliding member to form a stop therefor.

7. In a fender a buffer-bar, a support relatively fixed with respect thereto, means for mounting said bar upon said support, including a member slidably mounted upon said support, and a strap encircling said bar, and a leaf-spring secured to said support and forcing said bar against said strap and away from said support.

JAMES CLOSE.

Witnesses:
ELLEN M. NIHILL,
HARRY E. FERRIS.